United States Patent [19]

Groenendaal

[11] Patent Number: 5,716,654
[45] Date of Patent: Feb. 10, 1998

[54] DRY YEAST COMPOSITIONS AND PROCESSES FOR PREPARING THE SAME

[75] Inventor: Jan Willem Groenendaal, Delft, Netherlands

[73] Assignee: Gist-brocades, N.V., The Netherlands

[21] Appl. No.: 363,624

[22] Filed: Dec. 23, 1994

[30] Foreign Application Priority Data

Dec. 24, 1993 [EP] European Pat. Off. ............ 93203697.3

[51] Int. Cl.$^6$ ...................................................... A23L 1/28
[52] U.S. Cl. ................... 426/62; 426/61; 426/89; 426/96; 426/99; 426/549
[58] Field of Search ..................... 426/61, 62, 89, 426/96, 549, 18, 19, 60, 99, 555

[56] References Cited

U.S. PATENT DOCUMENTS

| | | | |
|---|---|---|---|
| 2,978,331 | 4/1961 | Ferrari | 426/61 |
| 3,440,059 | 4/1969 | Pomper et al. | 426/62 |
| 3,843,800 | 10/1974 | Langejan. | |
| 3,959,494 | 5/1976 | Starkie | 426/19 |
| 4,719,114 | 1/1988 | Percel | 426/62 |
| 4,935,249 | 6/1990 | Pelletier | 426/62 |

FOREIGN PATENT DOCUMENTS

| | | |
|---|---|---|
| 0 310460 A1 | 4/1989 | European Pat. Off.. |
| 2 690 813 | 12/1993 | European Pat. Off.. |
| 0 619 947 A 1 | 10/1994 | European Pat. Off.. |
| A-2233941 | 1/1975 | France. |
| 25 15 029 | 10/1976 | Germany. |
| 73040748 | 12/1973 | Japan. |

OTHER PUBLICATIONS

Leathers, T.D., *Biotechnol. Bioeng. Symp.* (1984) 14:225.

*Primary Examiner*—Leslie Wong
*Attorney, Agent, or Firm*—Morrison & Foerster LLP

[57] ABSTRACT

Dry granular yeast compositions for use in the production of bakery products and beverages. In particular, a dry granular yeast composition having a moisture content of not more than about 8% (w/w) and containing about 0.1 to 8% (w/w) of a bread-improving agent, wherein the dry yeast is present in granular form and said bread-improving agent is a coating on the dry yeast granules in the form of a film or adhered particles.

9 Claims, No Drawings

DRY YEAST COMPOSITIONS AND PROCESSES FOR PREPARING THE SAME

The present invention relates to dry yeast compositions, the production thereof and their use in bakery products and beverages.

The manufacture of a yeast composition starts with a small sample of a pure culture. This sample is used to inoculate the first of a series of fermentations in fermenters of successively increasing size. The first few are mildly aerated batch fermentations. Only the last two (or sometimes three) stages are performed using full aeration and incremental feeding of molasses. These fed-batch fermentations are carried out in fermenters having a volume of 100m$^3$ or more. Fermentation is typically carried out for a total of 12–20 hours during which time about 10,000–30,000 kg of compressed yeast is produced.

Further processing includes separating the yeast from the broth by centrifugation and washing which results in a yeast cream (17–23% (w/w) dry matter content).

The yeast cream may be processed into compressed yeast (27–33% (w/w) dry matter content) which is either sold as such or extruded and dried to produce active dry yeast (ADY) or instant dry yeast (IDY) with moisture contents of 6–8% (w/w) and 2–8% w/w, respectively.

In the case of ADY, drying usually takes place in belt or rotolouvre (drum) dryers. For IDY production, fluidized-bed drying is commonly used. Drying of the yeast to a level of about 20% w/w water content involves only the evaporation of free water. Further reduction of the moisture content requires removal of a portion of the bound water from the yeast which may cause damage to the yeast cell membrane. U.S. Pat. Nos. 3,843,800 and 4,248,420 describe use in such a drying process of a wetting agent such as a glycerol ester and/or fatty acid ester of propylene glycol so as to preserve the desired high direct leavening activity of the yeast.

Dry yeast loses part of its leavening activity during both drying and rehydration. Dry yeasts are still commonly used in the bakery trade because of their extended stability and because refrigeration is unnecessary. Dry yeasts are used in wine making to obtain a fast and reproducible fermentation thereby avoiding the risk of failure of natural fermentation. Moreover, the yeast is immediately available throughout the year.

Instant dry yeast (IDY) is the latest type of baker's yeast, which was introduced in the early 1970s (see for example U.S. Pat. No. 3,843,800). This was followed a few years later by introduction of instant dry wine yeast (IWY), which can be regarded as a special form of instant dry yeast. To obtain a high quality IDY, compressed yeast of relatively high protein content (42–60% (w/w)) must be dried in a quick drying process. The leavening activity of IDY under conditions of application is about 75–85% that of compressed yeast. The shelf life in a vacuum-sealed package is comparable to that of ADY.

IDY is presented typically in the form of very small rods that are highly porous and easy to rehydrate. On the one hand, this allows immediate use, without prior rehydration. On the other hand, the high porosity gives easy access to water and oxygen (from air) which results in a rather rapid loss of activity upon exposure to atmospheric conditions. For satisfactory results, IDY should be used within 3–5 days of opening the package. Moreover, the high porosity of IDY makes it sensitive to extreme rehydration conditions.

IDY usually has a moisture content of 2–8% (w/w) and a protein content between 42 and 60% (w/w) on a dry matter basis.

In, baking, besides bakers' yeast, processing aids such as bread improvers are used, including oxidising and reducing agents, enzymes such as redox enzymes, α-amylases, amyloglucosidases, hemicellulases, cellulases and proteases, lipases and phospholipases, emulsifiers and fatty materials. Yeast, enzymes and redox agents are added separately to doughs. Yeast may be added in cream, compressed, active dry or instant dry form. Enzymes may be added in dry powder or in dissolved form. Redox agents are in most cases used in powder form.

Separate weighing and dosing of these various ingredients increases the number of actions which have to be performed by the operators of the production process. Inherent in this increased number of actions is a greater chance of introducing errors resulting in negative impact on the quality of the end product. Moreover, working with dusty materials may initiate allergic reactions.

Mixing of ingredients with dry granular yeast or instant dry yeast may result in homogeneous products directly after mixing. However, during transport and storage prior to use, this type of product tends to lose homogeneity (see Example 1). To solve these problems various solutions have been proposed.

J-73040748 describes the mixing of granular semi-dry yeast (moisture content of 35–45% w/w) with a wheat flour improving agent for use in breadmaking. In such a mixture, the stability of both the flour improving agent and yeast is very limited due to the high water content. Thus, special attention has to be paid to storage and transport conditions.

DE-2515029 describes the production of active dry yeast by vacuum drying and coformulation of the dry yeast with spray dried malt extract or maltodextrins. Malt extract or maltodexrins are added as a dewatering agent. However, this vacuum drying technique cannot be applied economically on a commercial scale due to unacceptable loss in leavening activity. In general, a yeast composition produced by this technique will be in powder or dust form, which may result in allergy.

The present invention provides a dry yeast composition which has the advantage of provision of dry yeast with a bread-improving agent, but which has none of the above-mentioned disadvantages such as dust formation and loss of homogeneity of the composition during transport.

Thus, in one aspect the present invention provides a dry granular yeast composition having a moisture content of not more than about 8% (w/w) and containing about 0.1 to 8% (w/w) of a bread-improving agent, wherein the dry yeast is present in granular form and said bread-improving agent is present in a form selected from (a) a granulate having substantially the same granule size as the dry yeast, and (b) a coating on the dry yeast granules in the form of a film or adhered particles.

In principle, a dry yeast composition of the present invention may have substantially the same granule size or not a greatly increased granule size compared to the starting dry yeast before the bread-improving agent is added. Additionally, a composition of the invention has the same convenience of use as dry yeast, which makes application possible without adapting operational procedures or equipment.

Preferably, the bread-improving agent is added to the dry yeast at 1 to 4% (w/w). The bread-improving agent may preferably comprise one or more enzymes and/or ascorbic acid. Enzymes for this purpose can be selected from carbohydrases such as α-amylase, amyloglucosidase, hemicellulase, cellulase and glucanase, protein modifying enzymes such as proteases and peptidases, redox enzymes such as glucose oxidase, sulfhydryloxidase and lipoxidase (lipoxygenase), peptidyl transferases such as γ-glutamyl transferase and lipid modifying enzymes such as lipases and phospholipases.

In one embodiment of the invention, the bread-improving agent is present as a granulate having substantially the same granule size as the dry yeast. Where the bread-improving agent comprises more than one component, the components may be produced together as a homogeneous granular form or each component may be produced separately in granular form. The latter is especially preferred since this enables the ratio of the components of the bread-improving agent to be varied prior to mixing with the dry yeast. Mixing of the bread-improving agent and the dry yeast can be carried out using conventional mixing methods. Any known mixing method can be applied, provided attention is paid to preventing substantial damage to the granules, which may lead to loss of activity or dust formation.

In another embodiment of the invention, the bread-improving agent is coated on to the dry yeast granules. The coating may be in the form of very small adhered particles or a film. If a bread-improving agent is employed to provide a particle coating, preferably at least 50% of the particles will have a size smaller than 50 μm. It has been found advantageous for at least 80% of the particles to have a smaller size than 50 μm. Particles of a bread-improving agent which are too large for direct use in a composition of the invention can be reduced to appropriate size using suitable equipment known in the art such as a milling apparatus.

The bread-improving agent particles are stuck on to the dry yeast using suitable adhesives. These will be in general foodgrade adhesives, preferably have a keeping quality of at least two years when applied on dry yeast and will not influence the taste or flavour of the dry yeast, the dough prepared with the yeast or the final bread product. The adhesive is preferably added to a mixture of yeast granules and microfine bread-improving particles, e.g. at 0.5 to 1.0% (w/w). During application of the adhesive, continuous mixing is preferably carried out. The adhesive is preferably slowly supplied either continuously or batch-wise using small portions each time. After completion of addition of the adhesive, the mixing will continue until substantially all the bread-improving particles are stuck on to the dry yeast granules. While the adhesive can be poured on to the mixture, preferably the adhesive is sprayed on to the mixture to obtain a more uniform distribution. An in-line mixing process may be used (see Example 6).

Suitable adhesives are e.g. oils such as soy oil, cotton seed oil, rape seed oil, sunflower oil, corn oil, peanut oil, olive oil, paraffin oil, triglycerides, liquid fats and mixtures thereof. Fractionated oils can be used. The adhesive may include one or more additives which are beneficial in improving the sticking characteristics. Thus, for example, lecithin may be advantageously mixed with soy oil.

For formation of dry yeast granules with a film coating of a bread-improving agent, the bread-improving agent will be prepared in the form of a suspension, or solution. Subsequently, the suspension or solution will be coated on to the dry yeast granules by using coating apparatus known per se, e.g. a fluidized bed or coating pan. Excess water will be removed so as to provide a dry film of bread-improving agent around each dry yeast granule. A binding agent may be advantageously added to the suspension or solution of the bread-improving agent to promote binding to the yeast granules, e.g. hydroxypropyl cellulose.

In further aspects, the present invention additionally provides use of a dry granular yeast composition of the invention for incorporation into a dough or for fermentation of a beverage and doughs and beverage compositions incorporating such a dry yeast composition.

The following examples illustrate the invention.

EXAMPLE 1 (comparative example)

2,700 g FERMIPAN (dry yeast of Gist-brocades) were homogeneously mixed with 36 g ascorbic acid, 6 g fungal α-amylase FERMIZYME P$_{200}$ (Gist-brocades, hemicellulase activity 13,500 HU/g and α-amylase activity 942 PU/g) in a Hobart mixer. Directly after mixing, portions of 450 g were weighed and packed in aluminium bags, which were closed at reduced pressure.

The homogeneity of the contents of three packs was tested directly after packing by opening each pack at three places, near the top, in the middle, and near the bottom, is and withdrawing samples of 25 g from each opening. In these samples, the levels of ascorbic acid, fungal α-amylase and hemicellulase were analyzed according to the following methods:

—ascorbic acid analysis was carried out according to the conventional method of Boehringer.

—fungal α-amylase activity was determined using PHADEBAS tablets from Pharmacia. In this method, solubilization of dye-labelled starch by α-amylase over 15 minutes in a buffer at pH 5.5 and 30° C. is measured s spectrophotometrically. α-amylase activity is expressed in Phadebas Units (PU) using an *Aspergillus oryzae* funal α-amylase preparation of 10,000 PU/g as an internal standard. One Phadebas Unit defined in this way equals about 10 SKB units, used in the baking industry.

—fungal hemicellulase activity was determined by measuring the amount of reducing sugars produced over a predetermined time period in the micro-assay as described by Leathers T. D., Kurtzman, C. P. and Detroy, R. W. in Biotechnol. Bioeng. Symp., (1984) 14, 225. In this paper, the hemicellulase unit (HU) is also defined.

The results are summarised in Table 1.

Another three packs prepared as described above were stored for two weeks in a refrigerator at 4° C. Afterwards, these packs were placed in a conventional carton for instant yeast packs and surrounded by conventional instant yeast packs. This case was transported by a heavy goods vehicle over about 2500 km such that the packs were in a vertical position. Afterwards, the three test packs were stored in a refrigerator again for another four weeks. The homogeneity was then tested in the above described way. The analysis results are summarised in Table 1.

TABLE 1

|  | Homogeneous mix | | Relative Amount recovered (%) | |
|---|---|---|---|---|
|  |  |  | directly | after transport |
| Top | ascorbic acid | 0.013 g/g | 101.5 | 85.2 |
|  | α-amylase | 26 PU/g | 98.5 | 91.4 |
|  | hemicellulase | 232 HU/g | 100.8 | 92.5 |
| Middle | ascorbic acid | 0.013 g/g | 102.0 | 89.2 |
|  | α-amylase | 26 PU/g | 98.1 | 94.6 |
|  | hemicellulase | 232 HU/g | 99.6 | 91.4 |
| Bottom | ascorbic acid | 0.013 g/g | 99.1 | 112.3 |
|  | α-amylase | 26 PU/g | 101.7 | 108.6 |
|  | hemicellulase | 232 HU/g | 98.7 | 106.9 |

From these results, it is clear that during storage and transport, the mixture of yeast, ascorbic acid and enzymes lost homogeneity.

EXAMPLE 2

Mixing process for 1 kg dry yeast composition a) The following components were weighed:

| | | | |
|---|---|---|---|
| FERMIPAN (dry yeast of Gist-brocades) | 975.700 g | = | 97.57% |
| Vitainin C microfine | 16.873 g | = | 1.69% |
| Hemicellulase 25,690 HU/g | 0.856 g | = | 0.08% |
| α-amylase 11,400 PU/g | 1.632 g | = | 0.16% |
| KRISKOL 3000 (fractionated fat, Loders, Croklaan) | 5.000 g | = | 0.50% |
| | 1,000 g | | 100% | b) A premix was prepared consisting of 100 g FERMIPAN combined with the total amount of Vitamin C and enzymes by mixing the components with a spoon in a 250 ml beaker.

c) The premix was put in the mixing beaker of a Hobart planetary mixer together with the remaining part of the FERMIPAN.

d) Mixing was started and the KRISKOL 3000 was added in 30 Sec. The total mixing time was 10 mins.

e) The final product was vacuum packed in aluminium bags and stored at 5° C.

EXAMPLE 3

Mixing process for 30 kg dry yeast composition a) The following components were weighed:

| | | | |
|---|---|---|---|
| FERMIPAN | 29,121 g | = | 97.07% |
| Vitamin C microfine | 506.2 g | = | 1.69% |
| Hemicellulase 25,690 HU/g | 25.7 g | = | 0.08% |
| α-amylase 11,400 PU/g | 49.0 g | = | 0.16% |
| DURKEX 500 (mixture of soy oil and cotton seed oil, Otto Aldag, Hamburg) | 300 g | = | 1.00% |
| | 30,000 g | | 100% | b) A premix was prepared by combining 4,367 g FERMIPAN, the total amount of Vitamin C and enzymes and 99 g of Durkex 500 in a Hobart planetary mixer.

c) The premix was put in a Nauta conical mixer together with the remaining part of the FERMIPAN.

d) Mixing was started and the remaining part of the DURKEX 500 was added in 40 sec. The total mixing time was 10 mins.

e) The final product was vacuum packed in aluminium bags and stored at 5° C.

EXAMPLE 4

Granulating process for 500 kg of Vitamin C and enzymes prepared in a Multi-Stage spray-dryer and mixing process to produce 10,000 kg of dry yeast composition.

a) The following components were weighed:

| | | | |
|---|---|---|---|
| Vitamin C | 15.6 kg | = | 3.12% |
| Vitamin C sodium | 420.2 kg | = | 84.04% |
| Hemicellulase 25,690 HU/g | 22.1 kg | = | 4.42% |
| α-amylase 11,400 PU/g | 42.1 kg | = | 8.42% |
| | 500 kg | = | 100% |
| water | 750 kg | | | b) A solution was prepared by mixing the Vitamin C and enzymes with the water in a vessel of 1500 l equipped with a turbine stirrer.

c) Directly after preparation of the solution, it was fed to a Stork Multi-Stage spray-dryer and dried with fine return at an inlet temperature of about 160° C. and an outlet temperature of about 90° C.

d) 197 kg of the MSD-granulate was transported to a conical Nauta mixer with a capacity of 15 m³ together with 9,803 kg of FERMIPAN. The total mixing time was 20 mins.

e) The dried product was vacuum packed in aluminium bags and stored at 5° C.

EXAMPLE 5

Coating process for 5 kg dry yeast composition a) The following components were weighed:

| | | | |
|---|---|---|---|
| FERMIPAN | 4,803.5 g | = | 96.7% |
| Vitamin C microfine | 3 g | = | 0.06% |
| Vitamin C sodium | 81.4 g | = | 1.63% |
| Hemicellulase 25,690 HU/g | 4.3 g | = | 0.08% |
| α-amylase 11,400 PU/g | 8.2 g | = | 0.16% |
| hydroxypropyl cellulose | 100 g | = | 2.00% |
| | 5,000 g | | 100% |
| water | 1,979 g | | | b) A solution was prepared by mixing the Vitamin C, enzymes and hydroxypropyl cellulose with the water in a 3 l vessel equipped with a turbine stirrer.

c) Directly after the preparation of the solution, it was fed at a rate of about 15 g per min to an Aeromatic MG-1 fluidized bed coating apparatus equipped with a Wurster column containing the FERMIPAN. The inlet temperature was about 75° C. and the outlet temperature about 45° C.

d) The dried product was vacuum packed in aluminium bags and stored at 5° C.

EXAMPLE 6

In-line mixing process for 10,000 kg dry yeast composition a) The following components were weighed:

| | | | |
|---|---|---|---|
| FERMIPAN | 9,706.4 kg | = | 97.07% |
| Vitamin C microfine | 168.7 kg | = | 1.69% |
| Hemicellulase 25,690 HU/g | 8.6 kg | = | 0.08% |
| α-amylase 11,400 PU/g | 16.3 kg | = | 0.16% |
| DURKEX 500 | 100 kg | = | 1.00% |
| | 10,000 kg | | 100% | b) A premix was prepared of 1,456 kg of FERMIPAN combined with the total amount of Vitamin C and enzymes and 33 kg of the Durkex 500 in a Nauta conical mixer. The mixing time was 20 mins.

c) This premix was fed with the aid of pneumatic transport to an in-line mixer together with the remaining part of the FERMIPAN and the remaining part of the DURKEX 500. The flow of FERMIPAN, the premix and the DURKEX 500 were adjusted To accord with the above-mentioned composition with the aid of automatic dosing units.

d) Directly following the in-line mixer, the product was vacuum packed in aluminium bags and stored at 5° C.

I claim:

1. A homogeneous dry yeast composition comprising dry yeast and about 0.1 to 8% (w/w) of a bread-improving agent, wherein said composition has a moisture content of not more than about 8% (w/w), said dry yeast is present in a granular form, and said bread improving agent is a coating on the dry yeast granules in the form of a film or adhered particles and said bread improving agent is adhered to said dry yeast granules using 0.5% to 1.0% of a food grade adhesive.

2. The composition of claim 1, wherein at least 50% of said adhered particles have a diameter of less than 50 um.

3. The composition of claim 1 wherein said bread-improving agent particles are adhered to the dry yeast granules by means of an adhesive comprising one or more of edible oils, triglycerides and liquid fats.

4. The composition of claim 1 wherein the bread-improving agent comprises one or more enzymes and/or ascorbic acid.

5. The composition of claim 4 wherein said enzymes comprise at least one of a hemicellylase and an α-amylase.

6. A process for the production of the composition of claim 3 wherein dry yeast granules having a moisture content of not more than about 8% (w/w) are mixed with smaller particles of a bread-improving agent in the presence of an adhesive so that said yeast granules become coated with particles of the bread-improving agent.

7. A process for the production of the composition of claim 1 wherein a suspension or a solution of the bread-improving agent is coated onto dry yeast granules having a moisture content of not more than about 8% (w/w) followed by removal of excess moisture.

8. A process as claimed in claim 7 wherein coating of the yeast granules is carried out by a fluidized bed process or a coating pan process.

9. A method to prepare a dough which method comprises mixing the composition of claim 1 with the remaining ingredients of the dough.

* * * * *